United States Patent
Kim et al.

(10) Patent No.: US 7,698,586 B2
(45) Date of Patent: Apr. 13, 2010

(54) SYSTEM AND APPARATUS FOR ALLOWING DATA OF A MODULE IN POWER SAVING MODE TO REMAIN ACCESSIBLE

(75) Inventors: Won-Tae Kim, Seoul (KR); Sam-Yong Bahng, Seongnam (KR); Tae-Jin Yoo, Seoul (KR); Jong-Keun Ahn, Gunpo (KR); Yong-Ji Kim, Seoul (KR); Sang-Hee Lee, Yongin (KR); Min-Soo Kang, SeongNam (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 877 days.

(21) Appl. No.: 11/335,619

(22) Filed: Jan. 20, 2006

(65) Prior Publication Data

US 2006/0174144 A1    Aug. 3, 2006

(30) Foreign Application Priority Data

Jan. 31, 2005    (KR) .................... 10-2005-0008678

(51) Int. Cl.
*G06F 1/00* (2006.01)
(52) U.S. Cl. .................. 713/324; 713/300; 713/320
(58) Field of Classification Search ............... 713/300, 713/320, 322, 323, 324
See application file for complete search history.

(56) References Cited

U.S. PATENT DOCUMENTS

| | | | | |
|---|---|---|---|---|
| 5,230,067 A * | 7/1993 | Buch | ........................ | 710/107 |
| 5,511,170 A * | 4/1996 | Abdoo | ........................ | 710/100 |
| 5,535,381 A * | 7/1996 | Kopper | ........................ | 710/52 |
| 5,719,878 A * | 2/1998 | Yu et al. | ........................ | 714/726 |
| 5,999,876 A * | 12/1999 | Irons et al. | ........................ | 701/115 |
| 6,128,746 A * | 10/2000 | Clark et al. | ........................ | 713/324 |
| 6,167,524 A | 12/2000 | Goodnow et al. | | |
| 6,202,136 B1 * | 3/2001 | Wikle et al. | ........................ | 711/162 |
| 6,295,577 B1 * | 9/2001 | Anderson et al. | ........................ | 711/113 |
| 6,647,472 B2 * | 11/2003 | Atkinson et al. | ........................ | 711/158 |
| 6,735,743 B1 * | 5/2004 | McElvain | ........................ | 716/4 |
| 6,748,465 B2 * | 6/2004 | Howard et al. | ........................ | 710/36 |
| 6,788,567 B2 * | 9/2004 | Fujimori | ........................ | 365/154 |
| 7,058,834 B2 * | 6/2006 | Woods et al. | ........................ | 713/324 |
| 7,130,959 B2 * | 10/2006 | Tabuchi et al. | ........................ | 711/112 |
| 7,194,640 B2 * | 3/2007 | McCarty et al. | ........................ | 713/300 |
| 7,219,248 B2 * | 5/2007 | Shikata | ........................ | 713/323 |
| 7,284,019 B2 * | 10/2007 | Adkins et al. | ........................ | 707/202 |
| 7,392,447 B2 * | 6/2008 | Tang et al. | ........................ | 714/726 |
| 7,395,452 B2 * | 7/2008 | Nicholson et al. | ........................ | 714/22 |

(Continued)

FOREIGN PATENT DOCUMENTS

JP    2000137644    5/2000

(Continued)

*Primary Examiner*—Thomas Lee
*Assistant Examiner*—Jaweed A Abbaszadeh
(74) *Attorney, Agent, or Firm*—Harness, Dickey & Pierce, P.L.C.

(57) ABSTRACT

A portable system, method thereof, and a power consumption controller for controlling power consumption in a portable system are described. The portable system may include a storage unit, a module processing data, and a controller regulating power supplied to the module. The controller may regulate the module to perform a backup operation when a power saving mode begins and to interrupt the power after the backup operation is completed.

12 Claims, 4 Drawing Sheets

U.S. PATENT DOCUMENTS

| | | | |
|---|---|---|---|
| 7,523,331 B2 * | 4/2009 | Van Der Heijden | 713/323 |
| 2002/0162037 A1 * | 10/2002 | Woods et al. | 713/322 |
| 2003/0028723 A1 * | 2/2003 | Segev et al. | 711/113 |
| 2004/0088630 A1 * | 5/2004 | Arima et al. | 714/744 |
| 2004/0105302 A1 * | 6/2004 | Fujimori | 365/156 |
| 2004/0236968 A1 * | 11/2004 | Hill | 713/300 |
| 2005/0027956 A1 * | 2/2005 | Tormasov et al. | 711/162 |
| 2005/0125586 A1 * | 6/2005 | McCarty et al. | 710/306 |
| 2005/0283626 A1 * | 12/2005 | Shikata | 713/300 |
| 2006/0080563 A1 * | 4/2006 | Perozo et al. | 713/322 |
| 2006/0136656 A1 * | 6/2006 | Conley et al. | 711/103 |

FOREIGN PATENT DOCUMENTS

| | | |
|---|---|---|
| JP | 2003280761 | 10/2003 |
| WO | WO 93/25955 | 12/1993 |

* cited by examiner

SYSTEM AND APPARATUS FOR ALLOWING DATA OF A MODULE IN POWER SAVING MODE TO REMAIN ACCESSIBLE

PRIORITY STATEMENT

This U.S. non-provisional patent application claims the benefit under 35 U.S.C. §119 of Korean Patent Application 2005-08678, filed Jan. 31, 2005, the entire contents of which are incorporated herein by reference.

FIELD OF THE INVENTION

Example embodiments of the present invention are directed to a portable system and method of controlling power consumption in a portable system.

BACKGROUND OF THE INVENTION

Portable apparatuses and/or systems are supplied with power using a variety of techniques, for example, using battery packs having predetermined capacities. Accordingly, reducing power consumption may increase the amount of time a portable apparatus and/or system may be used before a battery pack requires replacement and/or recharging. Conventional systems and/or methods of reducing power consumption may be in the form of hardware improvements, for example, power devices, the use and/or development of materials, and software solutions including, but not limited to, adjusting powering conditions of peripheral devices by operating systems and application programs. However, while these conventional methods reduce power consumption by decreasing operational currents, it may be difficult and/or impossible to reduce power consumption due to static current of power supply voltages supplied into operation modules or due to leakage currents in modules using conventional methods and/or systems.

SUMMARY OF THE INVENTION

An example embodiment of the present invention is directed to an apparatus and method of controlling power in a portable system, capable of reducing and/or minimizing power consumption therein by interrupting power of an operation module for a time and restoring previous data when resuming an operation.

An example embodiment of the present invention provides a portable system including a storage unit; a module processing data; and a controller regulating power supplied to the module. The controller may regulate the module to perform a backup operation storing module data in the storage unit when a power saving mode begins and to interrupt the power after completing the backup operation.

An example embodiment of the present invention provides a method of controlling power in a portable system. The method may include fixing output data of the first module using at least one bus holding circuit when a power saving mode begins, backing-up data in the first module, and interrupting power supply for the first module.

An example embodiment of the present invention provides a power consumption controller. The power consumption controller may include a state machine sensing power supply and data processing states of the module and outputting a control signal when determining entrance and release of the power saving mode, a power control circuit regulating the power supplied into the module in response to the control signal, and a data transfer control circuit controlling transfer of module data from the module to the storage unit and transfer of backup data from the storage unit to the module.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
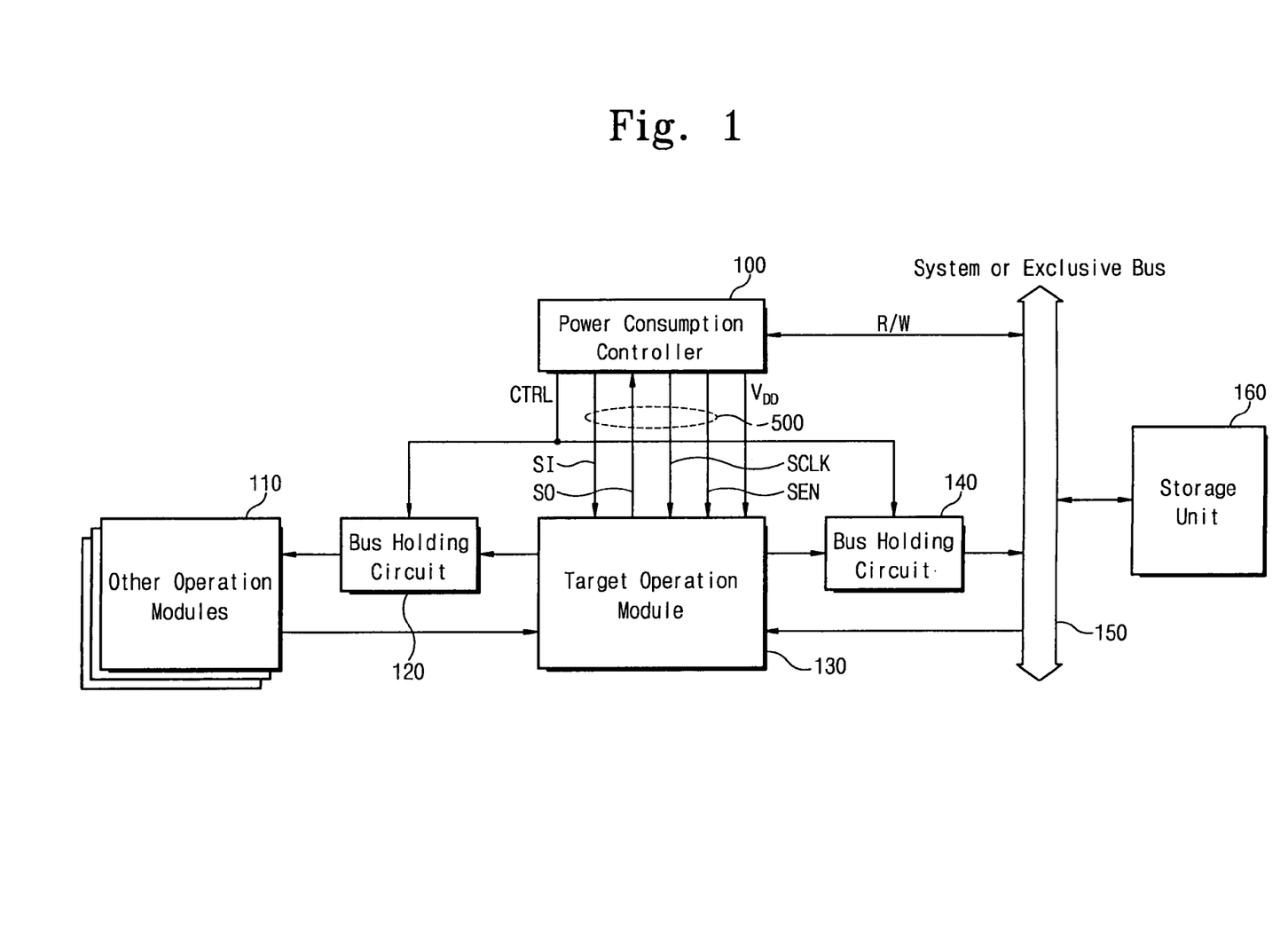
FIG. 1 is a block diagram illustrating a portable system according to an example embodiment of the present invention.

FIG. 1 is a block diagram illustrating a portable system according to an example embodiment of the present invention. As shown in FIG. 1, a portable system may include a power consumption controller 100, bus holding circuits 120 and 140, a system bus (or an exclusive bus) 150, a storage unit 160, operation modules 110, and a target operation module 130.

A target operation module 130 according to an example embodiment of the present invention may be a module selected to and/or capable of undergoing a power saving process. A target operation module 130 may be a designated module of a portable system. Still further, a target operation module 130 may be one of an operation module 110 that is selected. For example, a target operation module 130 may be selected from a plurality of operation modules 110 based on an input, control signal, and/or function of a portable system.

A target operation module 130 may correspond to a module embedding flipflops and/or memories invoked by blocks requesting data being processed or stored. Further, a target operation module 130 may include and/or be connected to a scan chain, which may enable testing of data input/output operations and controlling one or more clocks.

A power consumption controller 100 according to an example embodiment of the present invention may regulate a power source supplied thereto. A power consumption controller 100 may obtain data from a module and/or input data to a module through a scan chain. A target operation module 130 may be supplied and/or interrupted with the power source in response to, for example, a control signal of the power consumption controller 100, and may input data to and/or output data from the scan chain.

Bus holding circuits 120 and 140 according to an example embodiment of the present invention may maintain the last value of output data of an operation module before interrupting a power source when a power saving mode begins.

A system (or exclusive) bus 150 may be used as a path through which data obtained from a target operation module 130 by way of, for example, a scan chain may be transferred. A storage unit 160 may store data of a target operation module 130 in addresses designated by a power consumption controller 100. Operation modules 110 may utilize output data of a target operation module 130 even when a target operation module 130 is in a power saving mode. Accordingly, operation modules 110 may conduct normal operations, for example, transferring data to the target operation module 130 when a target operation module 130 is in a power saving mode.

A power consumption controller 100 according to an example embodiment of the present invention may monitor conditions of one or more operation modules for saving power in a portable system. A power consumption controller 100 may manage overall powering conditions, for example, may select an optimum power saving mode, may interrupt power to a module and may supply power to a module. A power consumption controller 100 may determine the desirability of a power saving mode for a target operation module 130 and may fix output data of a target operation module 130 using bus holding circuits 120 and 140 when a power saving mode begins and may obtain and restore data of flipflops included in a target operation module 130 via a scan chain. An input/output line group 500 passing through the scan chain may include a line for transferring input data SI to a target operation module 130, a line for transferring output data SO from a target operation module 130, a line for transferring a clock signal SCLK, and a line for transferring a control signal SEN to regulate the data input/output operations. Data obtained via the scan chain may be transferred to a system (or exclusive) bus 150, and may be stored in storage unit 160. Thereafter, a power source connected to a target operation module 130 may be interrupted. A power consumption controller 100 may apply power to a target operation module 130 and may restore the previous data of flipflops of a target operation module 130 to the original condition prior to an interruption of the power by reversing the operations regarding obtaining the data as described above. After completing a process of resuming the power supply and restoring data to a target operation module 130, bus holding circuits 120 and 140 may be released to activate data input/output operations of a target operation module 130. Accordingly, a power consumption controller 100 may regulate receiving and storing backup data into a storage unit 160 by controlling a system (or exclusive) bus 150, and restoring a target operation module 130 to a previous state using backup data prior to an interruption of the power if an operation resumes. A detailed structure and operation of a power consumption controller 100 will be described later in conjunction with an example embodiment of the present invention shown in FIG. 2.

Bus holding circuits 120 and 140 according to an example embodiment of the present invention may be disposed at output terminals of a target operation module 130. The bus holding circuits 120 and 140 may maintain last output data (e.g., the backup data) prior to a power interruption of a target operation module 130 and/or may maintain last output data. Accordingly, bus holding circuits 120 and 140 may be provided to prevent malfunctions of operation modules 110 involved therein, which may result in unstable conditions of output signals of a target operation module 130 when a power supply (for example, power supply voltage VDD) to the target operation module 130 is interrupted. Bus holding circuits 120 and 140 may be controlled by a power consumption controller 100 as illustrated in FIG. 1 (using, for example, control signal CTRL).

A system (or exclusive) bus 150 may be provided to offer a data path for storing internal data of a target operation module 130, which may be obtained by a power consumption controller 100, in a storage unit 160 and re-inputting stored data into a target operation module 130. A system bus, an exclusive bus, and/or an exclusive bus prepared only for the backup and restoration of internal data may be used for the data transfer.

A storage unit 160 may store internal data of a target operation module 130. A storage unit 160 may be supplied with obtained data and/or addresses by a power consumption controller 100. Obtained data may be stored based on addresses received from a power consumption controller 100. A storage unit 160 may be implemented with a main memory and/or a subsidiary memory embedded in the portable system.

Operation modules 110 may be all modules in a portable system except a target operation module 130. Operation modules 110 may exchange data with a target operation module 130 in a normal mode. Operation modules 110 may also be associated with a scan chain and the bus holding circuits. Further, according to an example embodiment of the present invention, each of the operation modules 110 may be assigned as a target operation module to decrease power consumption of the module, using a power saving mode when data input/output and/or internal operations are suspended for a predetermined time.

According to an example embodiment of the present invention, a power consumption controller 100 may determine that a target operation module 130 should be placed in a power saving mode and may then fix output data of the target operation module 130 using bus holding circuits 120 and 140. Thereafter, a power consumption controller 100 may obtain internal data from the target operation module 130 via the scan chain, and may transfer the obtained data using system (or exclusive) bus 150 to store the obtained data together with address information in a storage unit 160. The power consumption controller 100 may then interrupt the power of the target operation module 130, preventing further power consumption due to static voltages and/or leakage current.

Further, according to an example embodiment of the present invention, when resuming an operation of a target operation module 130 after a power interruption, a power consumption controller 100 may determine the target operation module 130 should be activated, and may supply the power to the target operation module 130. Then, backup data stored in an address designated by the power consumption controller 100 may be retrieved using system (or exclusive) bus 150. The backup data retrieved from the storage unit 160 may be applied to the target operation module 130 using the scan chain as an input path, restoring the data and functions of the target operation module to the same conditions present prior to the power interruption. After completing the data restoring operation for the target operation module 130, the bus holding condition may be released to permit a data exchange with the other operation modules 110 and/or the system (or exclusive) bus 150 and to recover the normal operation mode.

Figure 2:
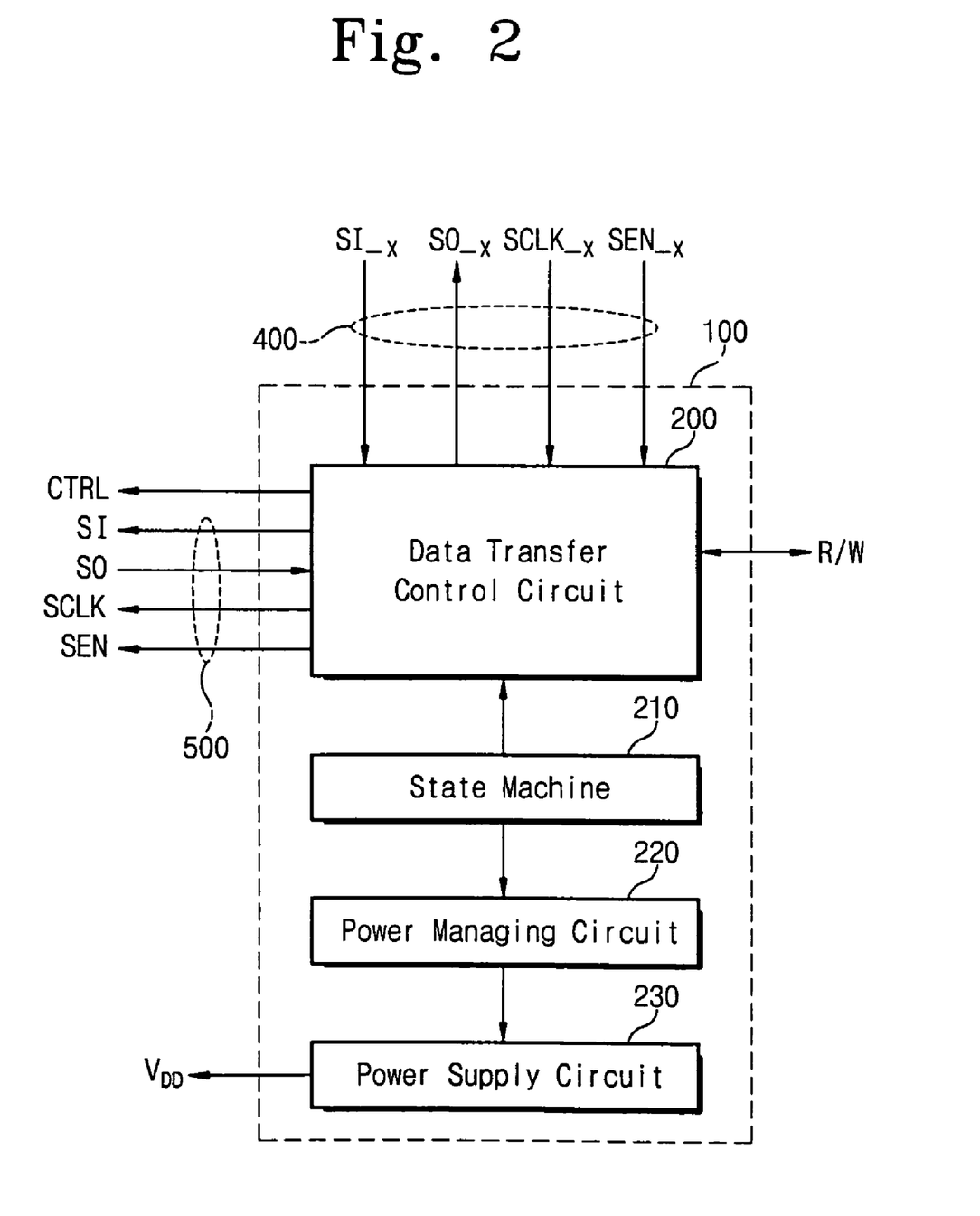
FIG. 2 is a block diagram illustrating a power consumption controller according to an example embodiment of the present invention.

FIG. 2 is a block diagram illustrating a power consumption controller 100 according to an example embodiment of the present invention. As shown in FIG. 2, a power consumption controller 100 may include a data transfer control circuit 200, a state machine 210, a power managing circuit 220, and/or a power supply circuit 230.

A data transfer control circuit 200 may obtain internal data from a target operation module 130 through the scan chain and may transfer the obtained data to the storage unit 160 along with the address information when a power saving mode begins. Further, the data transfer control circuit 200 may retrieve obtained data from the storage unit 160 and may input obtained data to a target operation module 130 through the scan chain when a target operation module 130 returns to a normal mode. A state machine 210 may monitor conditions of components in the portable system, may determine timings of a power interruption and/or supply, and may properly control the timings of data input and/or output by a data transfer control circuit 200. A power managing circuit 220 may adjust a voltage level of power based at least in part on a control signal of state machine 210 and/or may regulate the power supply, and a power supply circuit 230 may supply power to an operation module based at least in part on a control signal of a power managing circuit 220.

A data transfer control circuit 200 according to an example embodiment of the present invention may obtain data from flipflops of a target operation module 130 via a scan chain in response to a control signal of a state machine 210 when, for example, a power saving mode begins, and may store obtained internal data in a storage unit 160 using a system (or exclusive) bus 150 together with address information of internal data. Further, when a target operation module 130 is triggered to resume operation, a data transfer control circuit 200 may retrieve obtained data from the storage unit 160 via a system (or exclusive) bus 150 in response to a control signal of the state machine 210, and may restore the internal conditions of the target operation module 130 into the state thereof prior to the power interruption using a scan chain.

According to an example embodiment of the present invention, in order to fix an output of the target operation module 130 on a last value prior to a power interruption when a power saving mode begins, a data transfer control circuit 200 may activate bus holding circuits 120 and 140 based, at least in part, on a control signal of the state machine 210. Otherwise, when reactivating a target operation module 130, a data transfer control circuit 200 may release the data fixture operation using the bus holding circuits 120 and 140, which may terminate all operations of the power saving mode. Accordingly, a data transfer control circuit 200, storing and/or retrieving backup data in and/or from the storage unit 160 through the system bus 150, may have the controllability (or high priority) operable with a master operation granted by a system bus 150. According to an example embodiment of the present invention, when employing an exclusive bus instead of the system bus, the priority to control the bus operation may be wholly possessed by the data transfer control circuit 200.

A state machine 210 according to an example embodiment of the present invention may monitor operations of all the modules included in a portable system relevant to the power control function. A state machine 210 may be composed of a sequential logic circuit controlling processing operations of a data transfer control circuit 200 in a sequence of states based on conditioning information obtained by the monitoring operation. A state machine 210 may manage a power supply condition by turning the state sequence between the power supply and interruption. In addition, while transitioning to an invalid state that may be an improper power supply, the state machine 210 may stabilize a power supply condition for a portable system by regulating the next state to recover the condition to a valid state controllable in a normal mode. Accordingly, a state machine 210 according to an example embodiment of the present invention may prevent an invalid power supply state from being repeated unnecessarily when a malfunction of the power supply occurs, and may control data read-out from a storage unit 160 and data input to a target operation module 130 when the power saving mode is released.

A power managing circuit 220 according to an example embodiment of the present invention may control a voltage level of the power and/or timings of power supply and/or interruption in response to a control signal from a state machine 210.

A power supply circuit 230 according to an example embodiment of the present invention may interrupt and/or supply power for a module connected and/or disconnected to the power in response to a control signal of the power managing circuit 220.

A data transfer control circuit 200 according to an example embodiment of the present invention may address a data backup operation by obtaining internal data through a scan chain and transferring the obtained data to the storage unit 160, after activating bus holding circuits 120 and 140 in response to a control signal of a state machine 210 when a power saving mode begins, and may restore previous data using backup data (e.g., the internal or obtained data) from the storage unit 160 and inputting the backup data to the target operation module 130 being interrupted in power through a scan chain under the control of a state machine 210 when a target operation module 130 resumes its operation. According to an example embodiment of the present invention, after completing the data restoring process, bus holding circuits 120 and 140 may be released from the data fixture condition, activating the target operation module 130.

Figure 3:
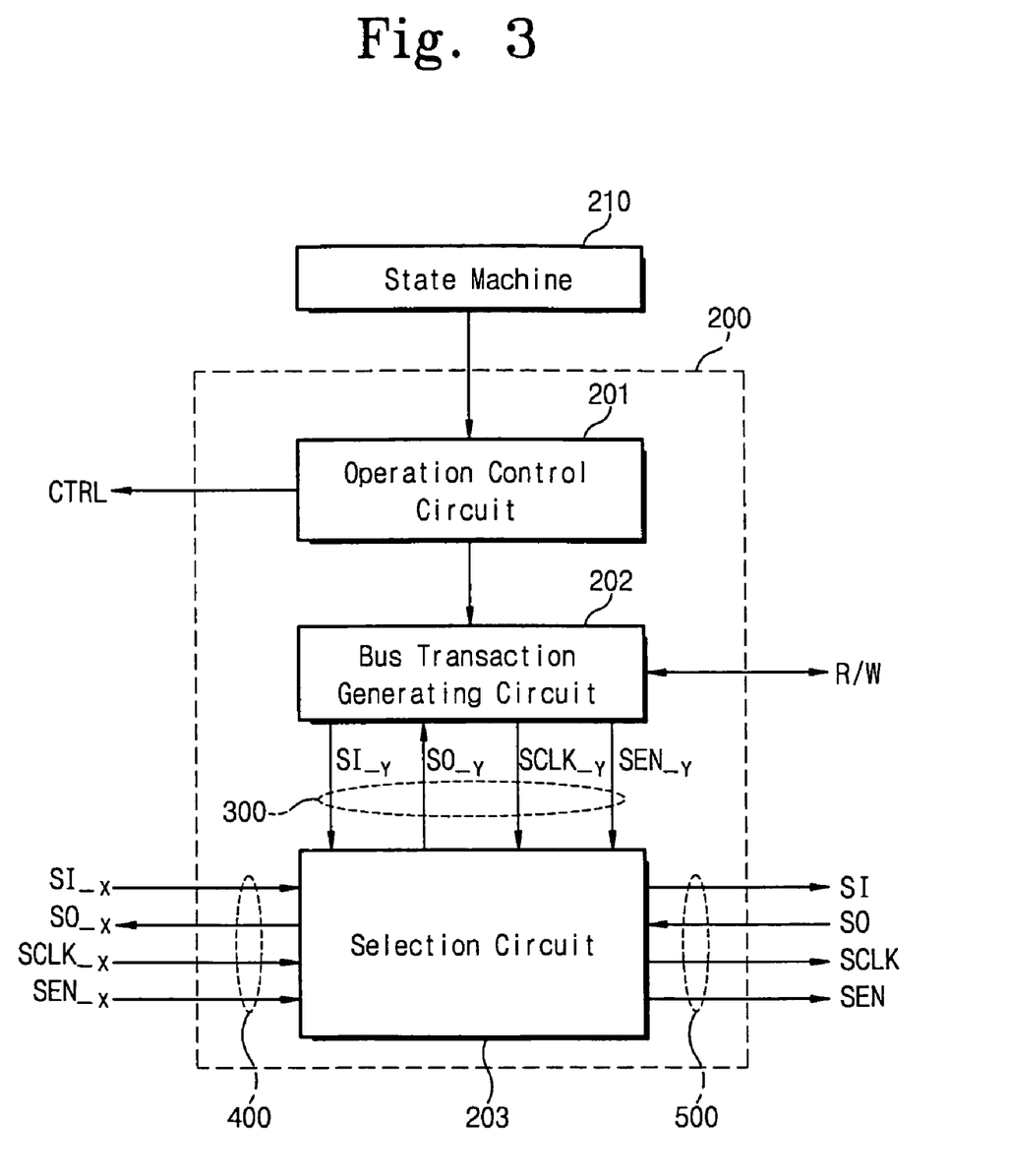
FIG. 3 is a block diagram illustrating a structure and operation of a data transfer control circuit according to an example embodiment of the present invention.

FIG. 3 is a block diagram illustrating structure and operation of a data transfer control circuit 200 according to an example embodiment of the present invention. As shown in FIG. 3, a data transfer control circuit 200 may include an operation control circuit 201, a bus transaction generating circuit 202, and a selection circuit 203. An operation control circuit 201 may regulate a data restoring operation. In a data restoring operation according to an example embodiment of the present invention, internal data may be obtained from a target operation module 130 through a scan chain and then stored in the storage unit 160, in response to the control signal of the state machine 210, and the backup data (i.e., the obtained data) may be retrieved from a target operation module 130 and then input to the target operation module 130 through the scan chain, when the target operation module 130 may be reactivated. A bus transaction generating circuit 202 may be provided to communicate with a system (or exclusive) bus 150 that may transfer obtained data of the target operation module 130 or the internal data of the storage unit 160 to be input to the target operation module 130, in response to a control signal CTRL of the operation control circuit 201. A selection circuit 203 may be configured to select one of a scan line 400 for a scan test to control the scan chain of a target operation module 130 in the power saving mode. An obtaining line 300 may be used to control a scan chain by the data transfer control circuit 200.

An operation control circuit 201 according to an example embodiment of the present invention may regulate operations such as obtaining data from a target operation module 130, data transfer of obtained data to storage unit 160, data retrieval of backup data (e.g., the obtained data) from the storage unit 160, and data restoration at the time of reactivating the target operation module 130. Further, an operation control circuit 201 may output signals associated with activating and/or releasing bus holding circuits 120 and 140 in response to a control signal of a state machine 210 at the beginning and terminating of a power saving mode.

A bus transaction generating circuit 202 according to an example embodiment of the present invention may be provided to transform data obtained from the scan chain into a data structure adaptable to a format of a system (or exclusive) bus 150 in response to a control signal CTRL of the operation control circuit 201, in order to transfer the obtained data to the storage unit 160 through the system (or exclusive) bus 150. Accordingly, backup data obtained through the scan chain may be transformed into data having a configuration with bus clock, address, and data length, adaptable to the formation of the system (or exclusive) bus 150, and may then be transferred to a storage unit 160. For example, when a target operation module 130 is reactivated (e.g., resumes operation), the bus transaction generating circuit 202 may read backup data from a storage unit 160 via the system (or exclusive) bus 150, may transform the backup data into an appropriate data format, and may input the transformed backup data into a target operation module 130.

A selection circuit 203 according to an example embodiment of the present invention may select between a scan line 400 provided to a target operation module 130 for testing the target operation module 130, and an obtaining line 300 for obtaining internal data of a target operation module 130 in the power saving mode. For example, if a power saving mode is activated, a selection circuit 203 may be regulated by an operation control circuit 201 in order to select an obtaining line 300.

According to an example embodiment of the present invention including an operation control circuit 201, a bus transaction generating circuit 202, and a selection circuit 203, output data of a target operation module 130 may be held and maintained in the last values and the internal data of a target operation module 130 may be obtained through the scan chain by the operation control circuit 201 under the control of the state machine 210 when the power saving mode begins. Further, obtained data may be transformed into a data format suitable for transferring the obtained data to a storage unit 160 using a bus transaction generating circuit 202, and transferred through the system bus with a priority of master operation or through an exclusive bus. A storage unit 160 may complete a data backup operation by storing the obtained data together with the address information. Still further, when a target operation module 130 resumes operation, backup data may be retrieved from storage unit 160 and transformed into the data format of the obtained data, in response to a control signal of an operation control circuit 201. Transformed backup data may be input to a target operation module 130 using a scan chain. After completing an input operation of backup data into a target operation module 130, an operation control circuit 201 may output a control signal triggering the release of a bus holding condition for the output data of a target operation module 130.

Figure 4:
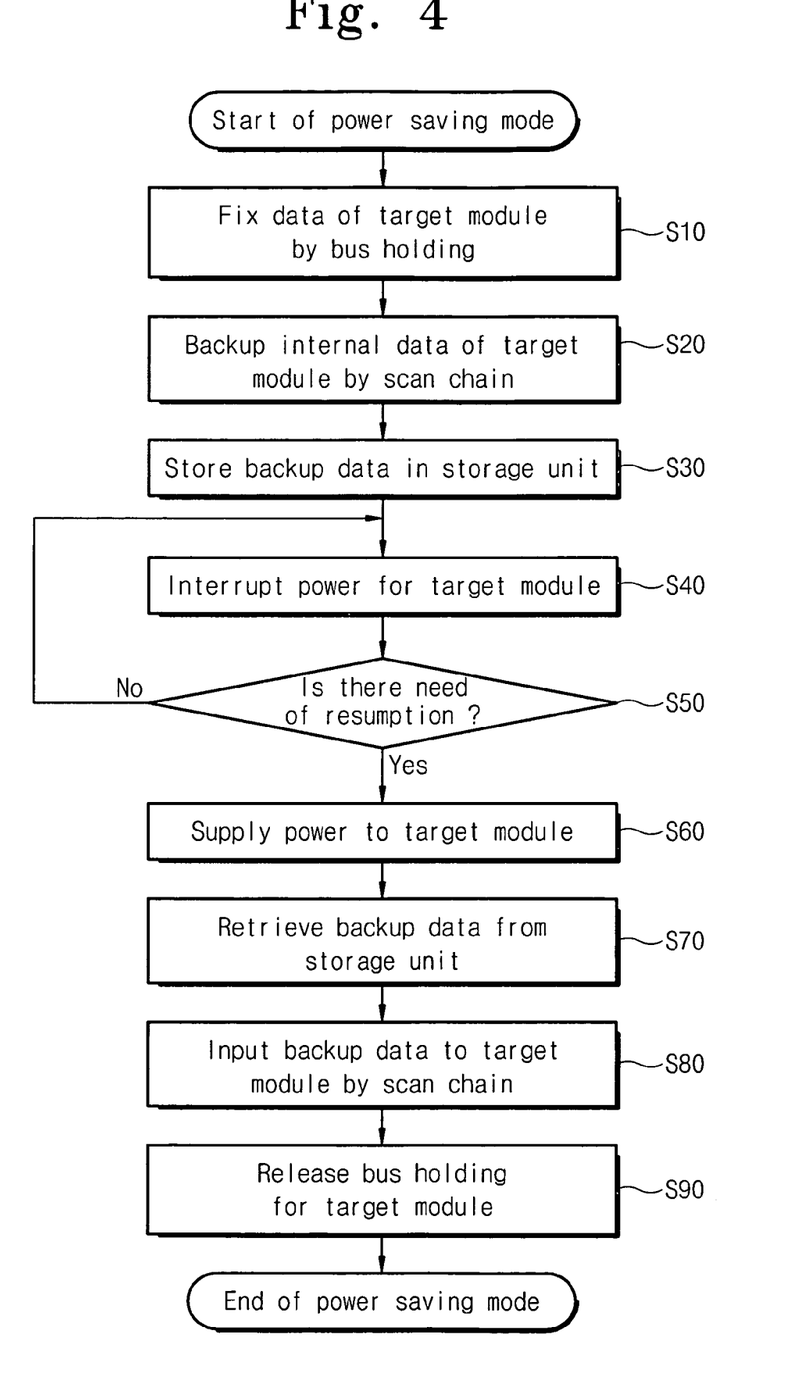
FIG. 4 is a flow chart showing a method of controlling power in a portable system according to an example embodiment of the present invention.

FIG. 4 is a flow chart showing the operations of a power consumption controller 100 when the power saving mode begins according to an example embodiment of the present invention.

As shown in FIG. 4, output data of the target operation module 130 may be fixed by bus holding circuits 120 and 140, which may prevent unstable input/output conditions, which may affect other modules (S10). While output data of a target operation module 130 may be fixed by bus holding circuits 120 and 140, the power consumption controller 100 may obtain internal data from flipflops of a target operation module 130 via the scan chain (S20). Internal data obtained from a target operation module 130 via the scan chain, e.g., the obtained data, may be transferred through a system (or exclusive) bus 150 and stored in the storage unit 160 (S30). After storing internal data of a target operation module 130 in storage unit 160, the power for the target operation module 130 may be interrupted (S40). A state machine 210 of a power consumption controller 100 may detect the states of peripheral modules to ascertain if power to the target operation module should be resumed (S50). If the target operation module 130 should be reactivated, power is supplied to a target operation module 130 to enable data input/output operations therein (S60). Next, backup data of a target operation module 130 stored in the storage unit 160 may be retrieved by way of the system (or exclusive) bus 150 (S70). The backup data retrieved from the storage unit 160 may be input to a target operation module 130 using a scan chain (S80). After completing the restoration of data, a bus holding condition may be released to enable the target operation module 130 to be operable in normal data input/output operations with the other operation modules 110 (S90). As a result, all processing operations of power saving and data restoring for the target operation module 130 may be terminated and the target operation module 130 may return to a normal operating condition. Thereafter, a power consumption controller 100 may check another one of the operation modules 110 and may repeat the aforementioned procedure associated with a power saving mode for another operation module 110 that is selected as a target operation module 130.

Accordingly, an example embodiment of the present invention may reduce power consumption due to static currents because an example embodiment of the present invention may interrupt the power supply to the target operation module after backing up data of the target operation module. An example embodiment of the present invention may provide effective constructions and methods in reducing power consumption for a portable system. Moreover, an example embodiment of the present invention may use a scan chain for testing internal data of the target operation module to be interrupted during a power saving mode. Further, an example embodiment of the present invention may be able to reduce the volume of logic circuits and/or enhance the speed of data backup and/or restoration by increasing the number of the scan chains used therein.

Although the present invention has been described in connection with example embodiments of the present invention illustrated in the accompanying drawings, it is not limited thereto. It will be apparent to those skilled in the art that various substitutions, modifications and changes may be made thereto without departing from the scope and spirit of the invention.

What is claimed is:

1. A portable system, comprising;
   a storage unit;
   a module that processes data;
   a bus holding circuit that maintains input/output terminals of the module with predetermined data states during a power saving mode; and
   a controller that regulates power supplied to the module;
   wherein the controller regulates the module to perform a backup operation storing module data in the storage unit when a power saving mode begins and to interrupt the power after completing the backup operation, and
   wherein the predetermined data states are last terminal states of the input/output terminals of the module just before starting the backup operation.

2. The portable system of claim 1, wherein the storage unit is a main storage unit or a subsidiary storage unit.

3. The portable system of claim 1, further comprising:
   a scan chain inputting the module data to or outputting the module data from the module based on a control signal for the backup operation.

4. The portable system of claim 3, wherein the control signal is generated by the controller.

5. The portable system of claim 1, wherein the controller includes:
   a state machine that senses power supply and data processing states of the module and outputs a control signal when determining entrance and release of the power saving mode;
   a power control circuit that regulates the power supplied to the module in response to the control signal; and
   a data transfer control circuit that controls transfer of module data from the module to the storage unit and transfer of backup data from the storage unit to the module.

6. The portable system of claim 5, wherein the state machine is a sequential logic circuit that recovers a power supply condition to a valid state from an invalid state.

7. The portable system of claim 5, wherein the data transfer control circuit is connected to the storage unit through a system bus.

8. The portable system of claim 7, wherein the data transfer control circuit has bus control authority assuring a master operation of the system bus, transferring data between the module and the storage unit.

9. The portable system of claim 5, wherein the data transfer control circuit transfers data between the module and the storage unit by way of an exclusive data bus.

10. The portable system of claim 7, wherein the data transfer control circuit comprises:
    an operation control circuit that regulates the bus holding circuits and transfer of the module data;
    a bus transaction generating circuit that transforms the module data into a format corresponding to the system bus; and
    a selection circuit that selects at least one of a scan line to test a module and an obtaining line to obtain the module data based on input from the operation control circuit.

11. The portable system of claim 1, wherein the controller controls the module to end the power saving mode by releasing the bus holding circuit after supplying the power to the module and applying the data stored in the storage unit to the module.

12. A power consumption controller, comprising:
    a state machine that senses power supply and data processing states of a module and outputs a control signal when determining entrance and release of a power saving mode;
    a power control circuit that regulates power supplied into the module in response to the control signal;
    a data transfer control circuit that controls transfer of module data from the module to a storage unit and transfer of backup data from the storage unit to the module; and
    a bus holding circuit that maintains last output data from the module;
    wherein the module data is outputted by a scan chain of the module during a backup operation.

* * * * *